US012073501B1

(12) United States Patent
Nagy

(10) Patent No.: US 12,073,501 B1
(45) Date of Patent: Aug. 27, 2024

(54) GENERATING FACIAL EXPRESSIONS USING A NEURAL NETWORK HAVING LAYERS OF CONSTRAINED OUTPUTS

(71) Applicant: Apple Inc., Cupertino, CA (US)

(72) Inventor: Gabor Nagy, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 141 days.

(21) Appl. No.: 17/663,254

(22) Filed: May 13, 2022

Related U.S. Application Data

(60) Provisional application No. 63/188,887, filed on May 14, 2021.

(51) Int. Cl.
*G06T 13/40* (2011.01)
*G06T 17/20* (2006.01)
*G06V 10/774* (2022.01)
*G06V 10/82* (2022.01)
*G06V 40/16* (2022.01)

(52) U.S. Cl.
CPC ............ *G06T 13/40* (2013.01); *G06T 17/205* (2013.01); *G06V 10/774* (2022.01); *G06V 10/82* (2022.01); *G06V 40/161* (2022.01); *G06V 40/174* (2022.01); *G06T 2210/36* (2013.01)

(58) Field of Classification Search
CPC ...................................................... G06T 13/40
See application file for complete search history.

(56) References Cited

U.S. PATENT DOCUMENTS

2021/0049468 A1\* 2/2021 Karras .................. G06N 3/045
2022/0130111 A1\* 4/2022 Martin Brualla ....... G06T 17/20

\* cited by examiner

*Primary Examiner* — Shivang I Patel
(74) *Attorney, Agent, or Firm* — Blank Rome LLP

(57) ABSTRACT

Generating an expressive avatar includes obtaining an expressive image of a face, and determining at least one target levels of detail for a representation of the face. A trained convolutional neural network model is applied to the expressive image of the face to obtain a mesh representation of the face at each of the at least one target levels of detail, wherein each convolution in the trained convolutional neural network model provides a unique level of detail, and an avatar is generated based on the mesh representation of the face at least of the at least one target levels of detail.

20 Claims, 6 Drawing Sheets

GENERATING FACIAL EXPRESSIONS USING A NEURAL NETWORK HAVING LAYERS OF CONSTRAINED OUTPUTS

BACKGROUND

This disclosure relates generally to image processing. More particularly, but not by way of limitation, this disclosure relates to techniques and systems for generating and utilizing a constrained neural network to generate facial expression meshes for an avatar.

Computerized characters that represent and are controlled by users are commonly referred to as avatars. Avatars may take a wide variety of forms including virtual humans, animals, and plant life. Some computer products include avatars with facial expressions that are driven by a user's facial expressions. Known existing systems tend to be computationally intensive, requiring high-performance general and graphics processors, and generally do not work well on mobile devices, such as smartphones or computing tablets, particularly when multiple avatars are presented in a scene. Further, existing avatar systems do not generally provide the ability to communicate nuanced facial representations.

DETAILED DESCRIPTION

Figure 1:
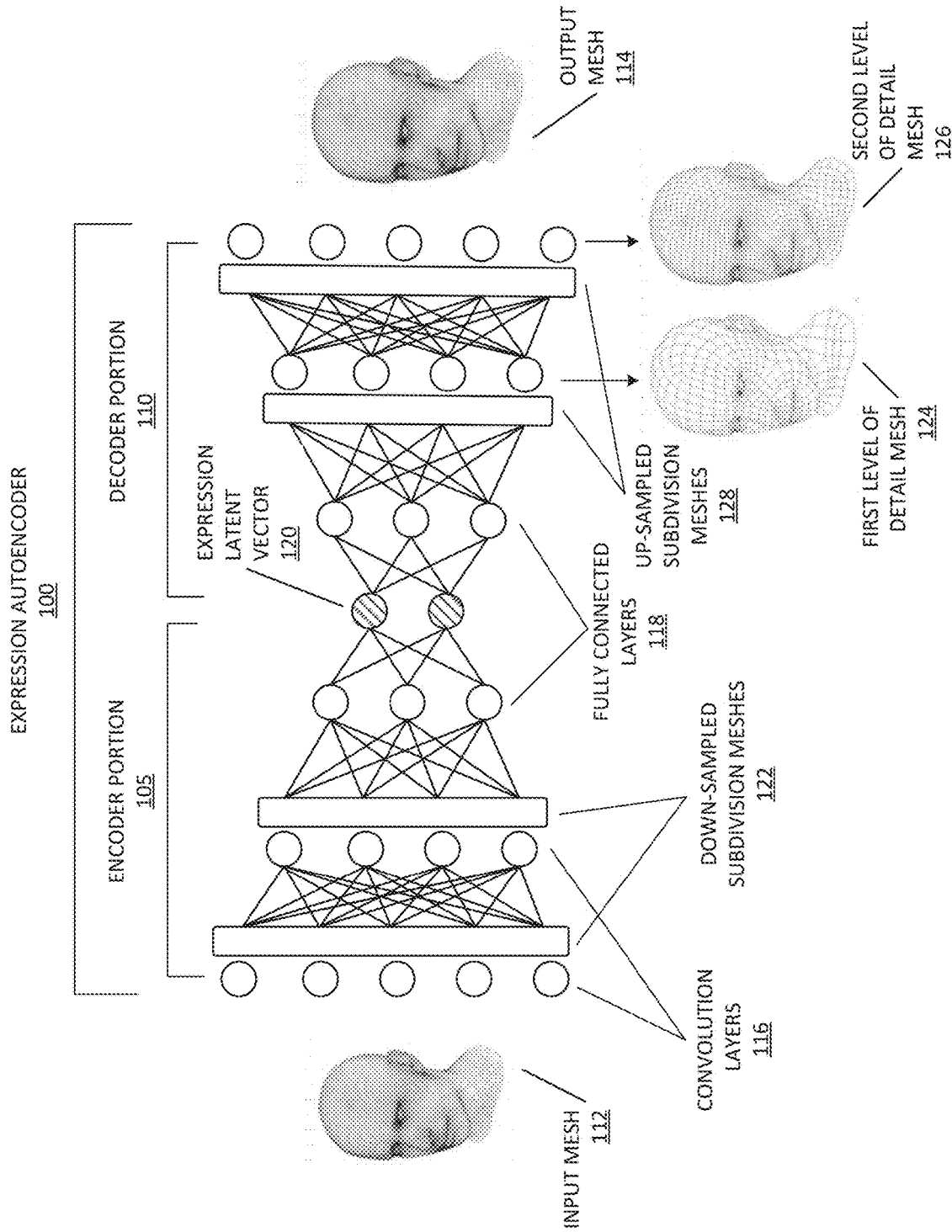
FIG. 1 shows an example diagram of a technique for generating facial expression meshes using a constrained neural network.

This disclosure pertains to systems, methods, and computer readable media to utilize a neural network to provide expressive meshes at multiple level of detail by constraining the convolutional layers to provide output meshes.

In general, a convolutional neural network autoencoder is trained to generate facial expressions meshes, which corresponds to the geometry of a face having a particular expression. In some embodiments, each convolutional layer may be constrained by a down-sampled version of a predefined expression mesh. For example, an artist may provide an expression mash and a subdivision process may be applied to obtain different levels of detail of the expression mesh. Those levels of detail are applied at each convolutional layer of the encoder to constrain the network. As a result, the decoder may provide, for each convolutional layer, an expression mesh of a different level of detail.

According to one or more embodiments, the decoder may be provided to a device such that the device can receive latent variables representing an expression, and can generate an expressive mesh from the latent variables. As such, in some embodiments, a device needs to only receive latent variables to render an avatar, rather than receiving a full avatar, or even a 3D mesh, saving bandwidth. Further, computational resources are conserved and consistency is improved by utilizing a single network that provides output meshes at multiple levels of detail.

For purposes of this disclosure, an autoencoder refers to a type of convolutional neural network used to classify data in an unsupervised manner. The aim of an autoencoder is to learn a representation for a set of data in an optimized form. A trained autoencoder will have an encoder portion, a decoder portion, and latent variables, which represent the optimized representation of the data.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood however that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of graphics modeling systems having the benefit of this disclosure.

Referring to FIG. 1, an example diagram is shown of a technique for generating facial expression meshes using a constrained neural network. In particular, the diagram depicts an architecture of an autoencoder convolutional neural network which has been modified to be constrained by sample meshes of various levels of detail to provide output meshes at multiple levels of detail.

An expression autoencoder 100 may be trained to take in an input expression mesh 112, and provide an output mesh 114. The expression autoencoder 100 may include an encoder portion 105 and a decoder portion 110. The encoder portion 105 may take an input mesh to reduce to an expression latent vector 120, from which the output mesh 114 may be obtained. The expression latent vector 120 includes latent variables corresponding to a condensed representation of the input mesh 120. The expression autoencoder 100 is a type of convolutional neural network and, as such, includes multiple convolutional layers 116. Each of the convolutional layers 116 are constrained by a down-sampled subdivision mesh 122. Each of the down-sampled subdivision meshes represents a version of a mesh provided, for example by artist rendering, to which a subdivision technique is applied to obtain variations of the mesh at different levels of detail. For example, a Catmull-Clark technique may be used to take an artist rendering of a 3D mesh and subdivide the vertices to generate a more detailed mesh. Similarly, a detailed mesh may be provided in less detailed form by combining vertices based on the Catmull-Clark or other subdivision technique, for example. As a result, the fully connected layers 118 of the expression autoencoder 100 may have a full representation of the combined variables based on the meshes.

At the decoder 110, up-sampled subdivision meshes 128 may be inserted to constrain each convolution to generate an output mesh at a particular level of detail. According to one or more embodiments, the up-sampled subdivision meshes 128 may be generated in a similar manner as the down-sampled subdivision meshes 122 described above. The up-sampled subdivision meshes may allow each convolution to provide an output mesh at different levels of detail, as shown by the first level of detail mesh 124 and the second level of detail mesh 126. Accordingly, given a particular input and level of detail, expression autoencoder 100 may be configured to provide an expression mesh in a given level of detail. Further, the architecture of the decoder may be "trimmed" to provide a lower level of detail if required for a particular device, for example.

Figure 2:
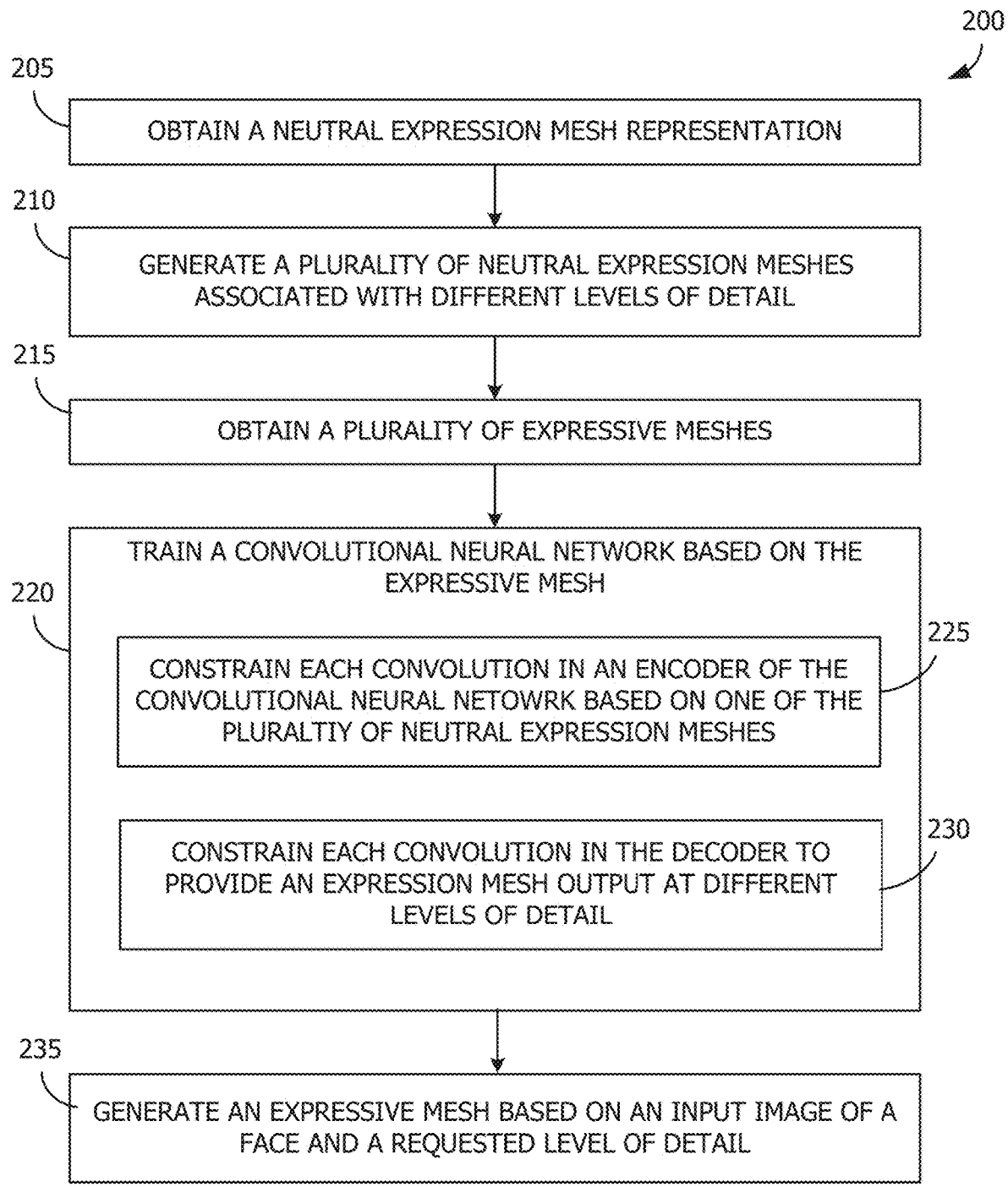
FIG. 2 shows a flowchart of a technique for generating an expressive mesh using a constrained neural network, according to one or more embodiments.

Referring to FIG. 2, a flowchart is illustrated in which a constrained neural network is trained. Although the various process depicted in FIG. 2 are illustrated in a particular order, it should be understood that the various processes described may be performed in a different order. Further, not all of the various processes may be necessary to be performed.

The flowchart 200 begins at 205, where the system obtains a neutral expression mesh representation. In one or more embodiments, the neutral expression mesh representation may be an artist-rendered mesh representation, or may be generated from an artist-rendered mesh representation. The neutral expression mesh includes a 3D mesh representation of a generic user having a neutral expression, or a face that is expression-less.

The flowchart 200 continues at block 210 where the system generates a plurality of neutral expression meshes associated with different levels of detail. Specifically, the system may take the artist-rendered mesh from block 205 and generates variations of the mesh at differing levels of detail. In one or more embodiments, a subdivision technique or refinement scheme may be applied to the artist-rendered mesh, such as a Catmull-Clark algorithm. Additionally, or alternatively, the mesh variations may be generated by an artist, or otherwise provided. Each of the model variations may be associated with a greater or lesser level of detail.

At block 215, a plurality of meshes are obtained representing faces presenting an expression. As used here, the phrase "expression" means a representation of a non-neutral expression (e.g., happy, sad, excited, fearful, questioning, etc.). The meshes may be obtained, for example, based on 3D scanned polygon meshes of faces presenting various facial expressions. In some embodiments, the training set includes a set of facial expression meshes that are fit to a standardized mesh layout or topology.

The flowchart continues at block 220 where a convolutional neural network is trained based on the images of faces obtained at block 215. In some embodiments, the convolutional neural network may be an autoencoder. At shown at block 225, the convolutional neural network may be trained such that each convolution in the encoder portion is constrained by one of the neutral expression meshes generated at 210. By constraining each convolutional layer, what would usually be useless or nonsensical data becomes usable data at each convolution of the decoder. As shown at 230, each convolution in the decoder may be constrained based on the plurality of neutral expression meshes such that each layer of the autoencoder may provide an output mesh at a level of detail corresponding to the level of detail used to constrain the convolution. As such, whereas most convolutional neural networks provide a single output, the decoder from the trained network is capable of providing an output for multiple convolutions. In addition, the topology of the mesh is preserved at different scales. The autoencoder may be trained until it can faithfully reproduce the 3D meshes of different facial expressions of different subjects at different levels of detail.

The flowchart concludes at 235, where the system generates an expressive mesh based on an input image of a face and a requested level of detail. That is, the system may use the trained convolutional neural network may be used to provide an expressive mesh at multiple levels of detail based on an input image. The requested level of detail may be one of the intermediary levels of detail of the convolutions of the decoder, or may be the final, fully detailed expression mesh from the trained autoencoder. In one or more embodiments, the trained convolutional neural network may provide 3D mesh vertex positions at the various levels of detail. Further, in some embodiments, multiple outputs may be provided for a given face, as will be described in FIG. 3.

Figure 3:
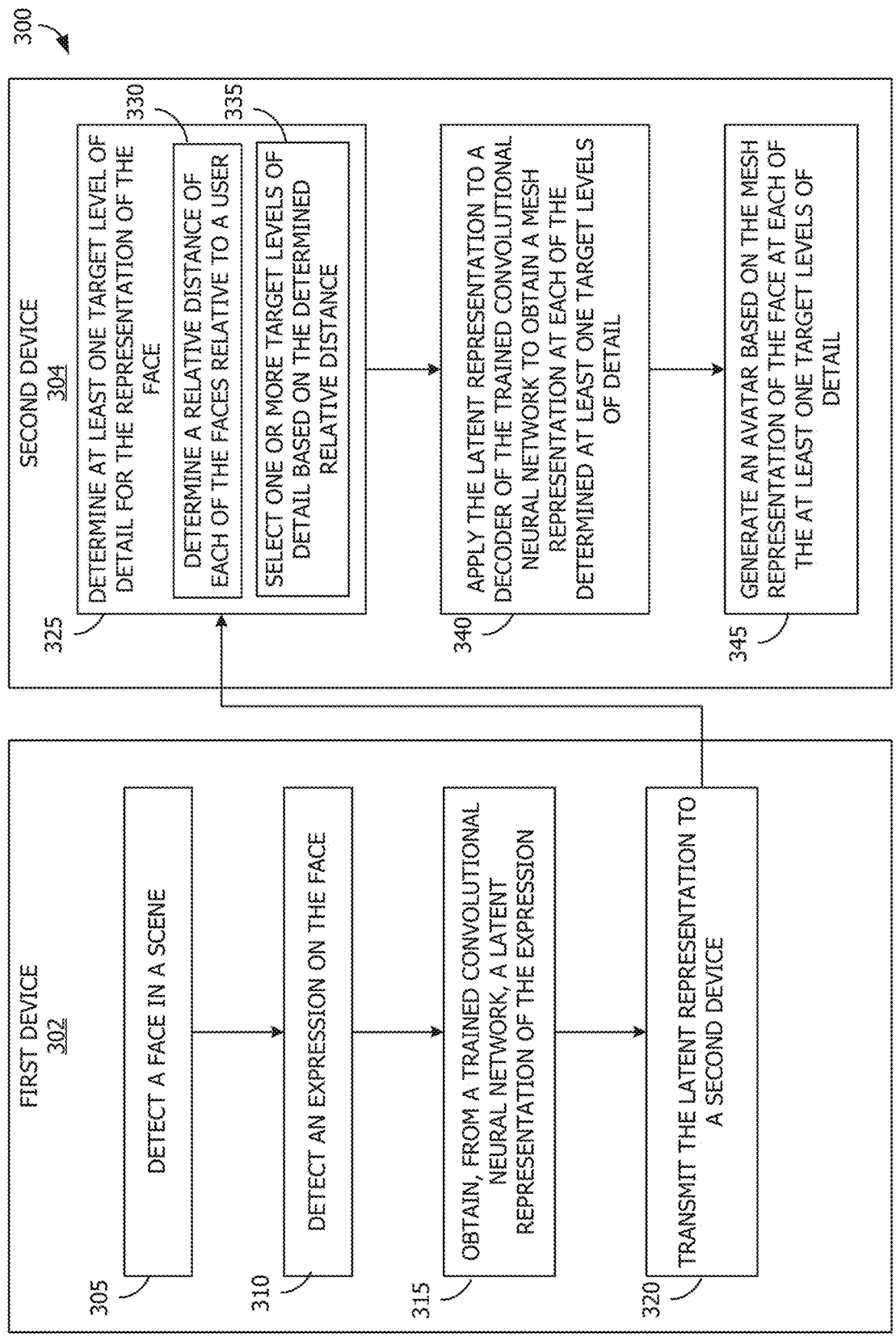
FIG. 3 shows a flowchart in which a neural network is trained to provide multiple target levels of detail, according to one or more embodiments.

Referring to FIG. 3, a flowchart is depicted in which an avatar is generated based on the expression meshes provided, for example, as described in FIG. 2 above. In particular, the flowchart 300 depicts a data flow between a first device 302 and a second device 304 in which an avatar may be generated. Although the various process depicted in FIG. 3 are illustrated in a particular order, it should be understood that the various processes described may be performed in a different order. Further, not all of the various processes may be necessary to be performed.

The flowchart 300 begins at block 305 where the system obtains an expressive image of a face. In one or more embodiments, the expressive image may be obtained by a camera of a user device, such as a phone, laptop, tablet, or other client device. The image of the face may be obtained naturally and may not have predetermined lighting or other conditions. In addition, the expressive image may be obtained from a still image or may be obtained from one or more frames from a video capture system. At block 310, an expression on the face is detected. The expression on the face may be detected, for example, by determining that the image of the faces presents a detectable expression.

The flowchart continues at block 315 where the first device 302 obtains from a trained convolutional neural network, a latent representation of the expression. In one or more embodiments, the first device 302 may generate a 3D mesh of the detected expression. The 3D mesh may be applied to the trained convolutional neural network to obtain the latent variables that define the mesh, as described above with respect to FIG. 1. At block 320, the first device 302 may transmit the latent representation to a second device 304 at which the avatar is to be rendered. In one or more embodiments, the first device 302 and the second device 304 may be communicably connected across a network. According to one or more embodiments, the latent variables may be obtained by the second device 304, for example, from a prior recorded session and utilized by the second device 304 to generate an avatar recreating the recording. Additionally, or alternatively, the latent variables may be obtained in real time or near real time to represent a live communication with a user of the first device 302.

The flowchart 300 continues at block 325, where at least one target level of detail for a representation of a face is determined. The target level of detail corresponds to a level of detail at which the mesh should be provided. As described above, a trained network may provide output meshes at a plurality of levels of detail, and one or more particular levels of detail may be requested. The one or more levels of detail may be requested automatically, and/or based on user input. In one or more embodiments, the one or more levels of detail may be selected based on a relative distance of one or more portions of the face relative to a user, as shown at block 330. For example, in a mixed reality environment, a user of a device may capture an image of an expressive face. The distance between the user and/or the user's device and the expressive face may be determined. In one or more embodiments, the relative distance may be determined based on a reference point of the face, or one or more points of the face, such that multiple distances are determined for a particular face, for example for each of multiple portions of the face. In one or more embodiments, the distance or distance may be determined based on sensor data obtained by the user device, such as a depth camera and the like. As shown at 335, one or more target levels of detail may be selected based on the determined relative distance.

The flowchart continues at 340 where the second device 304 obtains, from the trained convolutional neural network, a mesh representation of the face at each of the determined at least one levels of detail from block 325. As shown in FIG. 1, different convolutions may be associated with different levels of detail and may provide different outputs in part due to the constraint against the up-sampled and/or down-sampled meshes. In one or more embodiments, second device 304 may utilize a decoder portion of the trained autoencoder to obtain the mesh representation. In one or more embodiments, the latent variables may be applied to the decoder portion to obtain one or more mesh representations at different levels of detail. For example, the decoder may provide a mesh representation at a selected level of detail, or may provide multiple meshes at different levels of detail which may be selected for use in rendering an avatar.

The flowchart concludes at block 345 where the system generates an avatar of the face based on the mesh representation of the face at leach of the target levels of detail. In one or more embodiments, a single mesh may be obtained, onto which one or more textures may be applied to generate the avatar. In the situation in which multiple meshes are obtained, the portion of each mesh may be obtained for the corresponding portion of the face from which the depth was determined. The mesh portions may be stitched together, for example by matching vertices in the different portions, to generate a single mesh of the face having multiple levels of detail. A texture may then be applied to the hybrid mesh having multiple levels of detail to generate an avatar. For example, if a forehead of a face is closer to the device than the chin, then the portion of the mesh that includes the forehead may be a more detailed mesh representation than the portion of the mesh that corresponds to the chin, according to one or more embodiments.

Figure 4:
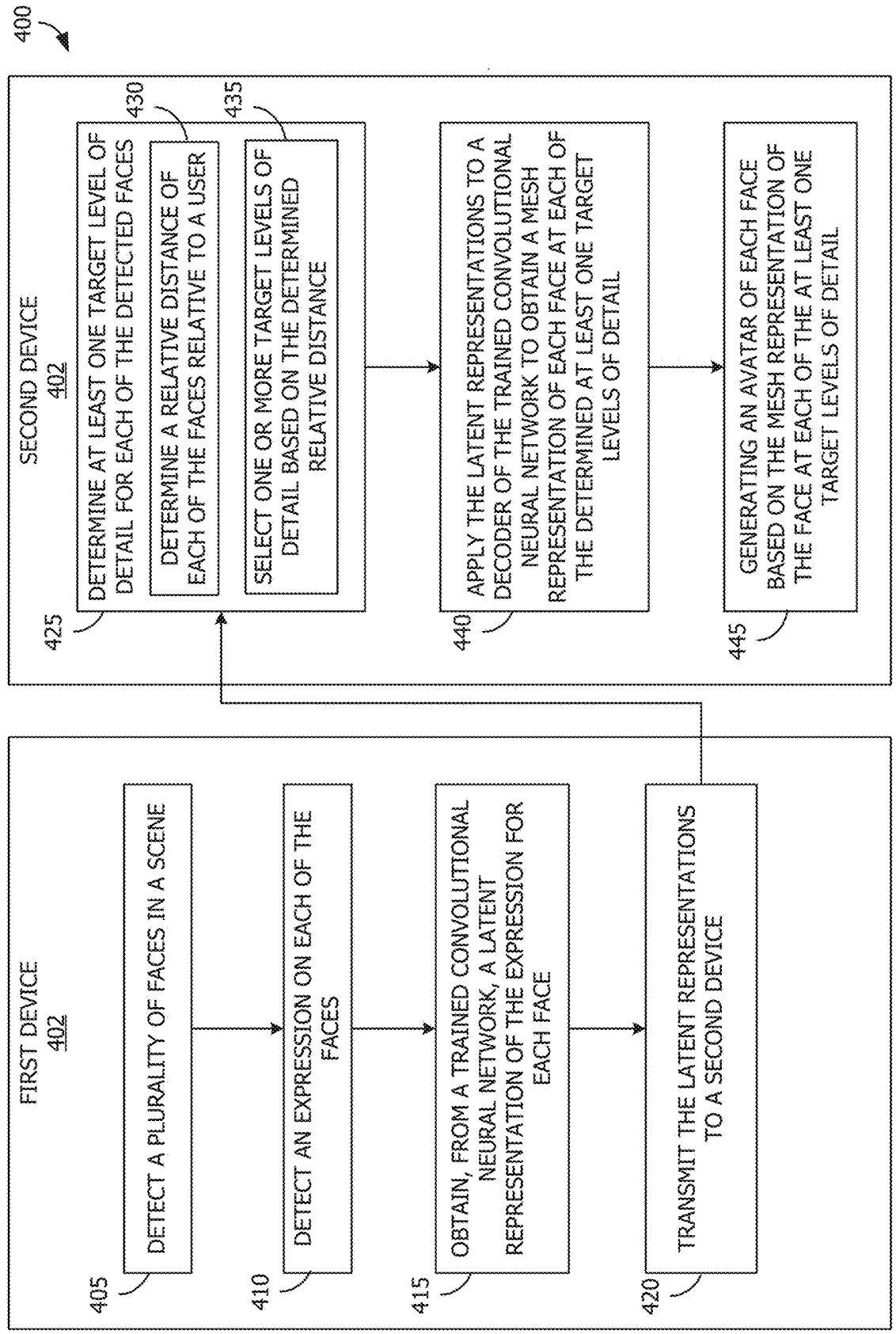
FIG. 4 shows a flowchart in which avatars are generated at multiple levels of detail, according to one or more embodiments.

Referring to FIG. 4, a flowchart is depicted in which multiple avatars are generated based on the expression meshes provided, for example, as described in FIG. 2 above. Although the various process depicted in FIG. 4 are illustrated in a particular order, it should be understood that the various processes described may be performed in a different order. Further, not all of the various processes may be necessary to be performed.

The flowchart begins at 405, where the first device 402 detects a plurality of faces in a scene. The faces may be detected based on visual means, depth means, or any other face detection technique. In one or more embodiments, the expressive image may be obtained by a camera of a user device, such as a phone, laptop, tablet, or other client device. The image of the face may be obtained naturally and, as such, may not have predetermined lighting or other conditions. In addition, the expressive image may be obtained from a still image or may be obtained from one or more frames from a video capture system. At block 410, an expression on the face is detected. The expression on the face may be detected, for example, by determining that the image of the faces presents a detectable expression.

The flowchart continues at block 415 where the first device 402 obtains from a trained convolutional neural network, a latent representation of the expression for each face. In one or more embodiments, the first device 402 may generate a 3D mesh of the detected expression of each face. The 3D mesh may be applied to the trained convolutional neural network to obtain the latent variables that define the mesh, as described above with respect to FIG. 1. At block 420, the first device 402 may transmit the latent representation to a second device 404 at which the avatar is to be rendered. In one or more embodiments, the first device 402 and the second device 404 may be communicably connected across a network.

The flowchart 400 continues at block 425, where at least one target level of detail for a representation of each face is determined. The target level of detail corresponds to a level of detail at which the mesh should be provided for the particular face. As described above, a trained network may provide output meshes at a plurality of levels of detail, and one or more particular levels of detail may be requested. The one or more levels of detail may be requested automatically, and/or based on user input. In one or more embodiments, the one or more levels of detail may be selected based on a relative distance of one or more portions of each face relative to a user, as shown at block 430. For example, in a mixed reality environment, a user of a device may capture an image of faces in a scene. The distance between the user and/or the user's device and each face in the scene may be determined. In one or more embodiments, the relative distance may be determined based on a reference point of the face, or one or more points of the face, such that multiple distances are determined for a particular face, for example for each of multiple portions of the face. Further, the relative distance may be measured in a total distance format, or relative closeness to the device among the faces in the scene. That is, the distance may be determined relative to the user or user device generating the avatar, and/or relative among the multiple faces in the scene. In one or more embodiments, the distance or distances may be determined based on sensor data obtained by the user device, such as a depth camera and the like. As shown at 435, one or more target levels of detail may be selected based on the determined relative distance for each face.

In one or more embodiments, additional or alternative selection parameters besides distance may be considered in determining target levels of detail. For example, a number of users in the scene may affect a target level of detail in order to manage multiple avatars given particular system resources. Similarly, available system resources such as memory and processing power may be used to select a target level of detail for one or more faces in a scene.

The flowchart continue at 425 where the system obtains, from the trained convolutional neural network, a mesh representation for each face at each of the determined at least one levels of detail from block 410. As shown in FIG. 1, different convolutions may be associated with different levels of detail and may provide different outputs in part due to the constraint against the up-sampled and/or down-sampled meshes. In one or more embodiments, second device 404 may utilize a decoder portion of the trained autoencoder to obtain the mesh representations. In one or more embodiments, the latent variables may be applied to the decoder portion to obtain one or more mesh representations at different levels of detail. For example, the decoder may provide a mesh representation at a selected level of detail, or may provide multiple meshes at different levels of detail which may be selected for use in rendering an avatar.

The flowchart concludes at block 445 where the system generates an avatar of the face based on the mesh representation of the face at leach of the target levels of detail. In one or more embodiments, for a particular face, a single mesh may be obtained, onto which one or more textures may be applied to generate the avatar. In the situation in which multiple meshes are obtained for a particular face, the portion of each mesh may be obtained for the corresponding portion of the face from which the depth was determined. The mesh portions may be stitched together, for example by matching vertices in the different portions, to generate a single mesh of the face having multiple levels of detail. A texture may then be applied to the hybrid mesh having multiple levels of detail to generate an avatar for the particular face. For example, if a forehead of a face is closer to the device than the chin, then the portion of the mesh that includes the forehead may be a more detailed mesh representation than the portion of the mesh that corresponds to the chin, according to one or more embodiments. The multiple avatars may then be presented in a scene at varying levels of detail.

Figure 5:
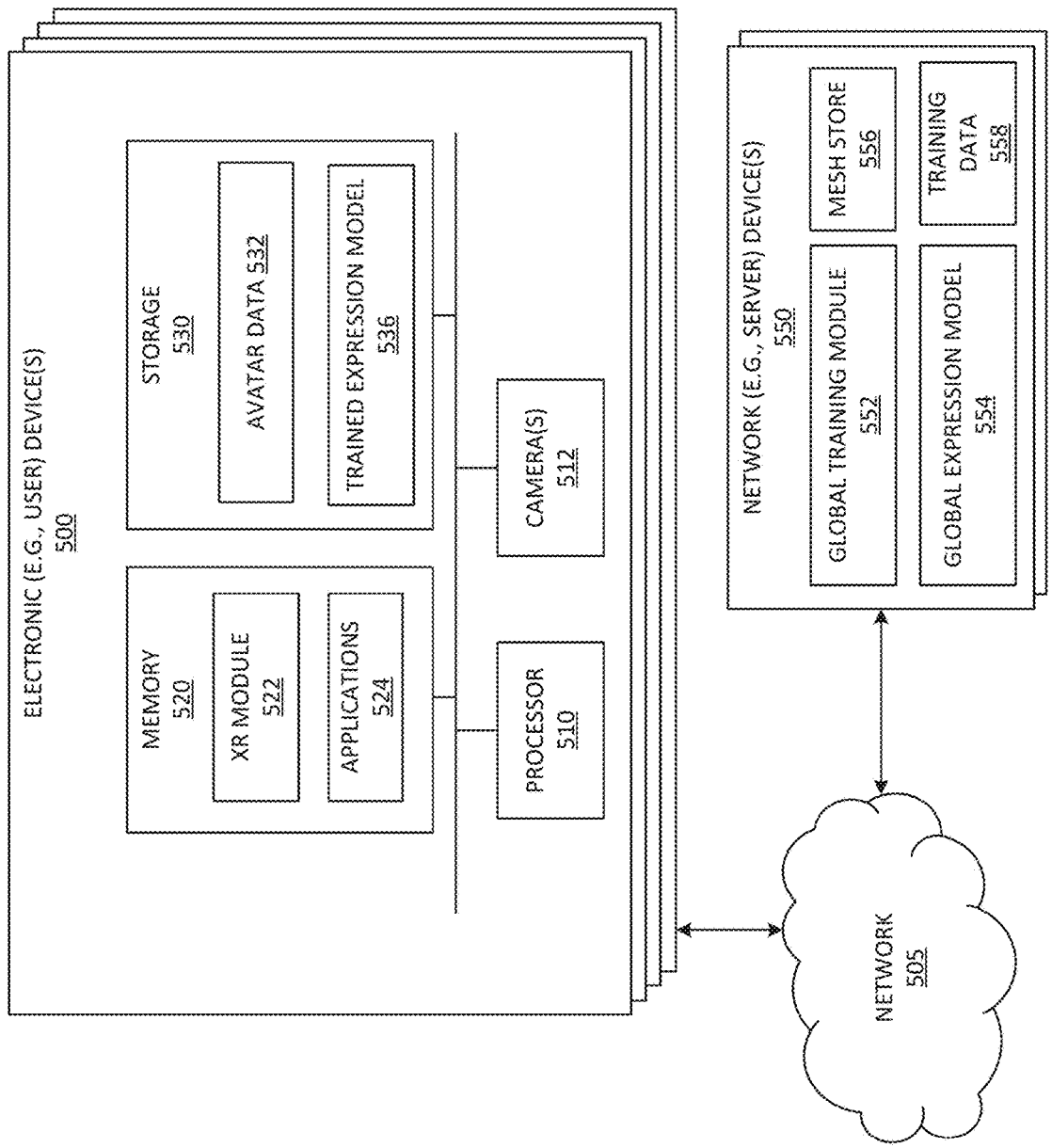
FIG. 5 shows, in block diagram form, a multi-function electronic device in accordance with one or more embodiments.

Referring to FIG. 5, a simplified block diagram of a network device 550 is depicted, communicably connected to an electronic device 500, in accordance with one or more embodiments of the disclosure. Electronic device 500 may be part of a multifunctional device, such as a mobile phone, tablet computer, personal digital assistant, portable music/video player, wearable device, base station, laptop computer, desktop computer, network device, or any other electronic device. Network device 550 may represent one or more server devices or other network computing devices within which the various functionality may be contained, or across which the various functionality may be distributed. Network device 550 may be connected to the client device 500 across a network 505. Illustrative networks include, but are not limited to, a local network such as a universal serial bus (USB) network, an organization's local area network, and a wide area network such as the Internet. Electronic device 500 is generally used to generate and/or present an avatar which is rendered in part based on a selected level of detail.

It should be understood that the various components and functionality within network device 550 and electronic device 500 may be differently distributed across the devices, or may be distributed across additional devices.

Electronic Device 500 may include processor, such as a central processing unit (CPU) 510. Processor 510 may be a system-on-chip such as those found in mobile devices and include one or more dedicated graphics processing units (GPUs). Further processor 510 may include multiple processors of the same or different type. Electronic Device 500 may also include a memory 520. Memory 520 may each include one or more different types of memory, which may be used for performing device functions in conjunction with processor 510. For example, memory 520 may include cache, ROM, RAM, or any kind of transitory or non-transitory computer readable storage medium capable of storing computer readable code. Memory 520 may store various programming modules for execution by processor 510, including a mixed reality ("MR") module 522, as well as other applications 524. Electronic device 500 may also include storage 530. Storage 530 may include one more non-transitory computer-readable mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Storage 530 may avatar data 532 and trained expression model 536. Avatar data 532 may include information which may be used to generate a particular user's avatar such as texture information, and trained expression model 536 may include the trained convolutional neural network which is configured to provide multiple outputs (i.e., per convolution) for a given input, and which is configured to provide an expression mesh for a given input. Electronic device 500 may also include one or more cameras 512 or other sensors, such as depth sensor, from which depth of a scene may be determined. In one or more embodiments, each of the one or more cameras 512 may be a traditional RGB camera, or a depth camera. Further, cameras 512 may include a stereo- or other multi-camera system, a time-of-flight camera system, or the like which capture images from which depth information of a scene may be determined. Client device 500 may allow a user to interact with mixed reality (MR) environments. There are many different types of electronic systems that enable a person to sense and/or interact with various MR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes.

According to one or more embodiments, the network device 550 may store a global training module 522, which may be configured to train a model, such as the trained expression model 536 or the global expression model 554, based on image data from a single subject or multiple subjects. The image data may be stored, for example, as training data 558 in network device 550. In one or more embodiments, a network device 550 may store a global expression model 554 which may be trained on additional or different training data than the trained expression model 536 stored in electronic device 500. The network device 550 may also include a mesh store 556 which may include one or more meshes, which may be used to train the expression models.

Returning to electronic device 500, XR module 522 may be configured to support extended reality services, such as rendering an avatar, for example, depicting a face in the environment of electronic device 500. The avatar may be rendered according to an output mesh and additional data, such as head pose, lighting condition, and a view vector.

Although electronic device 500 is depicted as comprising the numerous components described above, in one or more embodiments, the various components may be distributed across multiple devices. Particularly, in one or more embodiments, one or more of the training module 552 and XR module 522 may be distributed differently across the electronic device 500 and the network device 550. Accordingly, although certain calls and transmissions are described herein with respect to the particular systems as depicted, in one or more embodiments, the various calls and transmissions may be made differently directed based on the differently distributed functionality. Further, additional components may be used, some combination of the functionality of any of the components may be combined.

Figure 6:
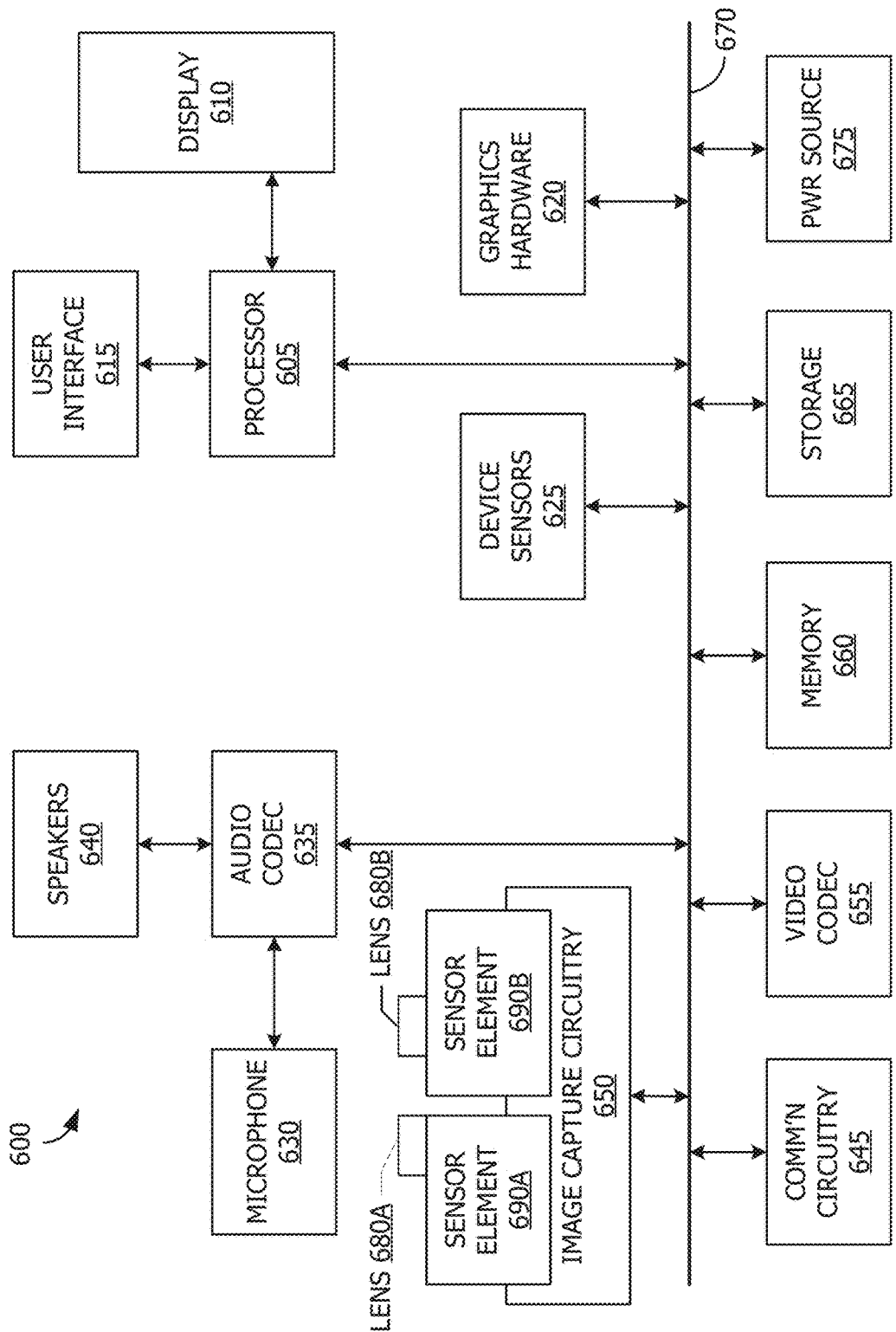
FIG. 6 shows, in block diagram form, a computer system in accordance with one or more embodiments.

Referring now to FIG. 6, a simplified functional block diagram of illustrative multifunction electronic device 600 is shown according to one embodiment. Each of electronic devices may be a multifunctional electronic device, or may have some or all of the described components of a multifunctional electronic device described herein. Multifunction electronic device 600 may include processor 605, display 610, user interface 615, graphics hardware 620, device sensors 625 (e.g., proximity sensor/ambient light sensor, accelerometer and/or gyroscope), microphone 630, audio codec(s) 635, speaker(s) 640, communications circuitry 645, digital image capture circuitry 650 (e.g., including camera system) video codec(s) 655 (e.g., in support of digital image capture unit), memory 660, storage device 665, and communications bus 670. Multifunction electronic device 600 may be, for example, a digital camera or a personal electronic device such as a personal digital assistant (PDA), personal music player, mobile telephone, or a tablet computer.

Processor 605 may execute instructions necessary to carry out or control the operation of many functions performed by device 600 (e.g., such as the generation and/or processing of images as disclosed herein). Processor 605 may, for instance, drive display 610 and receive user input from user interface 615. User interface 615 may allow a user to interact with device 600. For example, user interface 615 can take a variety of forms, such as a button, keypad, dial, a click wheel, keyboard, display screen and/or a touch screen. Processor 605 may also, for example, be a system-on-chip such as those found in mobile devices and include a dedicated graphics processing unit (GPU). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 to process graphics information. In one embodiment, graphics hardware 620 may include a programmable GPU.

Image capture circuitry 650 may include two (or more) lens assemblies 680A and 680B, where each lens assembly may have a separate focal length. For example, lens assembly 680A may have a short focal length relative to the focal length of lens assembly 680B. Each lens assembly may have a separate associated sensor element 690. Alternatively, two or more lens assemblies may share a common sensor element. Image capture circuitry 650 may capture still and/or video images. Output from image capture circuitry 650 may be processed, at least in part, by video codec(s) 655 and/or processor 605 and/or graphics hardware 620, and/or a dedicated image processing unit or pipeline incorporated within circuitry 650. Images captured may be stored in memory 660 and/or storage 665.

Sensor and camera circuitry 650 may capture still and video images that may be processed in accordance with this disclosure, at least in part, by video codec(s) 655 and/or processor 605 and/or graphics hardware 620, and/or a dedicated image processing unit incorporated within circuitry 650. Images so captured may be stored in memory 660 and/or storage 665. Memory 660 may include one or more different types of media used by processor 605 and graphics hardware 620 to perform device functions. For example, memory 660 may include memory cache, read-only memory (ROM), and/or random access memory (RAM). Storage 665 may store media (e.g., audio, image and video files), computer program instructions or software, preference information, device profile information, and any other suitable data. Storage 665 may include one more non-transitory computer-readable storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 660 and storage 665 may be used to tangibly retain computer program instructions or code organized into one or more modules and written in any desired computer programming language. When executed by, for example, processor 605 such computer program code may implement one or more of the methods described herein.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic (s) of virtual object(s) in a XR environment may be made in response to representations of physical motions (e.g., vocal commands).

A person may sense and/or interact with a XR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various XR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of steps or actions shown in FIGS. 2-4 or the arrangement of elements shown in FIGS. 1, 5, and 6 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method for generating an expressive avatar comprising:
   obtaining a latent representation of an expressive image of a face;
   determining at least one target levels of detail for a representation of the face;
   applying the latent representation to a trained convolutional neural network model to obtain a geometric representation of the face at each of the at least one target levels of detail, wherein each convolution of a plurality of convolutions in the trained convolutional neural network model is constrained by one of a plurality of generic geometric representations having different levels of detail to provide a geometric representation having a unique level of detail; and
   generating an avatar based on the geometric representation of the face at each of the at least one target levels of detail.

2. The method of claim 1, wherein generating the avatar comprises:
   identifying a first target level of detail and a second target level of detail of the at least one target levels of detail;
   obtaining a first portion of a first geometric representation of the face at a first level of detail and a second portion of a second geometric representation of the face at a second level of detail; and
   stitching the first portion of the first geometric representation and the second portion of the second geometric representation.

3. The method of claim 2, wherein the first target level of detail and the second target level of detail are selected based on a distance of the corresponding portions of the face to a user of a device generating the avatar.

4. The method of claim 1, further comprising:
   detecting a plurality of faces in the scene;
   obtaining an image for each of the plurality of users in the scene, wherein the image for each of the plurality of users in the scene comprises the expressive image of the user;
   determine at least one target levels of detail for each of the plurality of users; and
   generating an avatar for each of the plurality of faces based on the determined at least one target levels of detail.

5. The method of claim 4, wherein at least one target levels of detail are selected based on a relative distance of each of the faces to a user of a device generating the avatar for each of the plurality of faces.

6. The method of claim 1, wherein the trained convolutional neural network is trained based on facial image training data, wherein each convolution is constrained by one of a plurality of neutral expression meshes.

7. The method of claim 6, wherein the trained convolutional neural network comprises a convolutional autoencoder, and wherein each convolution of an encoder of the convolutional autoencoder is constrained by one of the plurality of neutral expression meshes, wherein each convolution is constrained by a downsampled neutral expression mesh of the plurality of neutral expression meshes.

8. A non-transitory computer readable medium comprising computer readable code executable by one or more processors to:
   obtain a latent representation of an expressive image of a face;
   determine at least one target levels of detail for a representation of the face;
   apply the latent representation to a trained convolutional neural network model to obtain a geometric representation of the face at each of the at least one target levels of detail, wherein each convolution of a plurality of convolutions in the trained convolutional neural network model is constrained by one of a plurality of generic geometric representations having different levels of detail to provide an geometric representation having a unique level of detail; and
   generate an avatar based on the geometric representation of the face at each of the at least one target levels of detail.

9. The non-transitory computer readable medium of claim 8, wherein the computer readable code to generate the avatar comprises computer readable code to:
   identify a first target level of detail and a second target level of detail of the at least one target levels of detail;
   obtain a first portion of a first geometric representation of the face at a first level of detail and a second portion of a second geometric representation of the face at a second level of detail; and
   stitch the first portion of the first geometric representation and the second portion of the second geometric representation.

10. The non-transitory computer readable medium of claim 9, wherein the first target level of detail and the second target level of detail are selected based on a distance of the corresponding portions of the face to a user of a device generating the avatar.

11. The non-transitory computer readable medium of claim 8, further comprising computer readable code to:
   detect a plurality of faces in the scene;
   obtain an image for each of the plurality of users in the scene, wherein the image for each of the plurality of users in the scene comprises the expressive image of the user;
   determine at least one target levels of detail for each of the plurality of users; and
   generate an avatar for each of the plurality of faces based on the determined at least one target levels of detail.

12. The non-transitory computer readable medium of claim 11, wherein at least one target levels of detail are selected based on a relative distance of each of the faces to a user of a device generating the avatar for each of the plurality of faces.

13. The non-transitory computer readable medium of claim 8, wherein the trained convolutional neural network is trained based on facial image training data, wherein each convolution is constrained by one of a plurality of neutral expression meshes.

14. The non-transitory computer readable medium of claim 13, wherein the trained convolutional neural network comprises a convolutional autoencoder, and wherein each convolution of an encoder of the convolutional autoencoder is constrained by one of the plurality of neutral expression meshes, wherein each convolution is constrained by a down-sampled neutral expression mesh of the plurality of neutral expression meshes.

15. A system comprising:
one or more processors; and
one or more computer readable medium comprising computer readable code executable by the one or more processors to:
obtain a latent representation of an expressive image of a face;
determine at least one target levels of detail for a representation of the face;
apply the latent representation to a trained convolutional neural network model to obtain a geometric representation of the face at each of the at least one target levels of detail, wherein each convolution of a plurality of convolutions in the trained convolutional neural network model is constrained by one of a plurality of generic geometric representations having different levels of detail to provide an output geometric representation having a unique level of detail; and
generate an avatar based on the geometric representation of the face at each of the at least one target levels of detail.

16. The system of claim 15, wherein the computer readable code to generate the avatar comprises computer readable code to:
identify a first target level of detail and a second target level of detail of the at least one target levels of detail;
obtain a first portion of a first geometric representation of the face at a first level of detail and a second portion of a second geometric representation of the face at a second level of detail; and
stitch the first portion of the first geometric representation and the second portion of the second geometric representation.

17. The system of claim 16, wherein the first target level of detail and the second target level of detail are selected based on a distance of the corresponding portions of the face to a user of a device generating the avatar.

18. The system of claim 15, further comprising computer readable code to:
detect a plurality of faces in the scene;
obtain an image for each of the plurality of users in the scene, wherein the image for each of the plurality of users in the scene comprises the expressive image of the user;
determine at least one target levels of detail for each of the plurality of users; and
generate an avatar for each of the plurality of faces based on the determined at least one target levels of detail.

19. The system of claim 18, wherein at least one target levels of detail are selected based on a relative distance of each of the faces to a user of a device generating the avatar for each of the plurality of faces.

20. The system of claim 15, wherein the trained convolutional neural network is trained based on facial image training data, wherein each convolution is constrained by one of a plurality of neutral expression meshes.

* * * * *